Dec. 18, 1956 C. G. CONGER 2,774,144
WIDTH GAUGE FOR VEHICLE WHEEL RIMS
Filed May 5, 1951 2 Sheets-Sheet 1
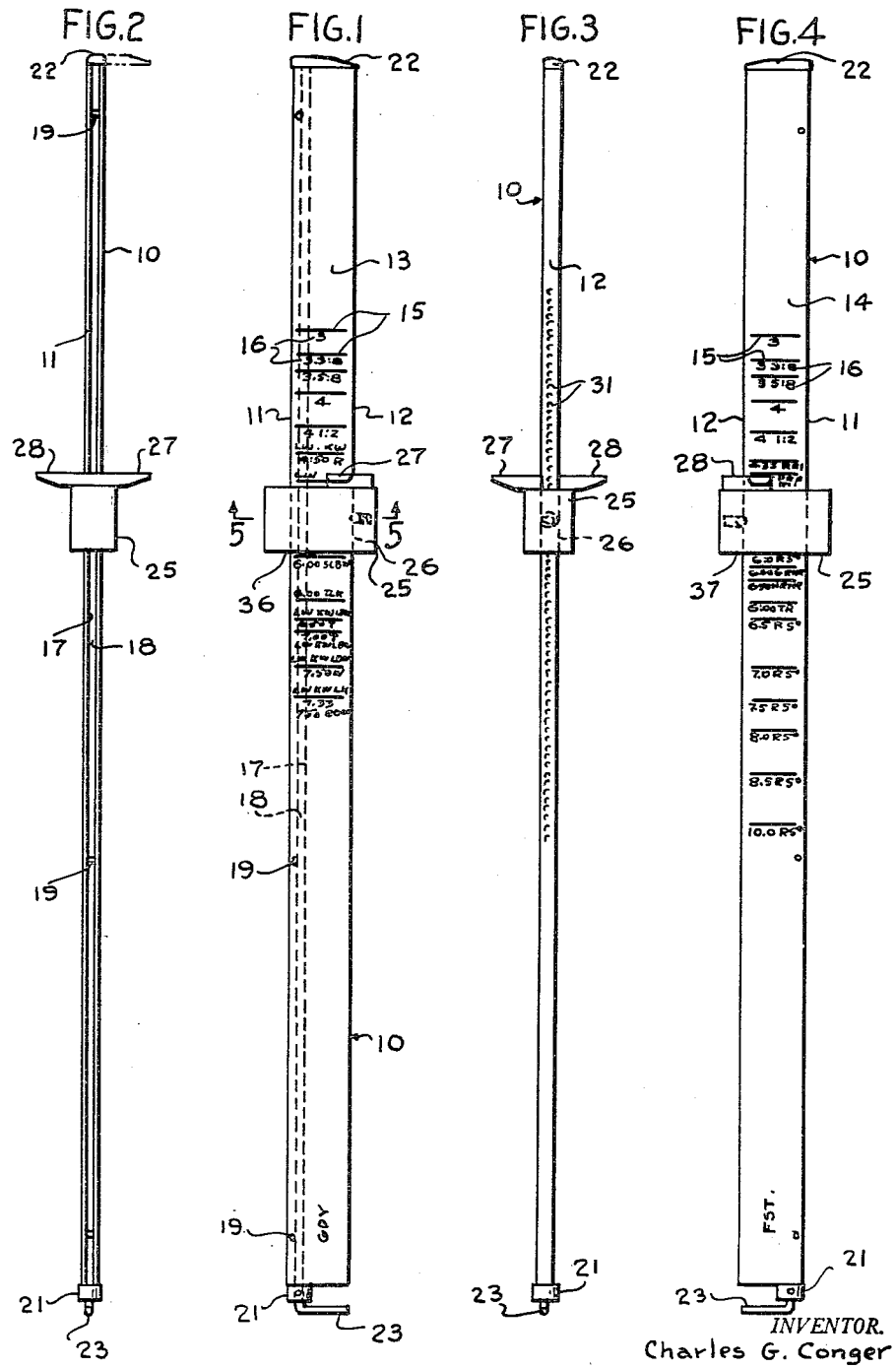
INVENTOR.
Charles G. Conger
BY William Cleland
Attorney Dec. 18, 1956  C. G. CONGER  2,774,144
WIDTH GAUGE FOR VEHICLE WHEEL RIMS
Filed May 5, 1951  2 Sheets-Sheet 2
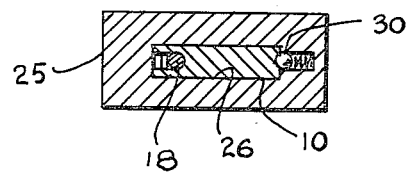
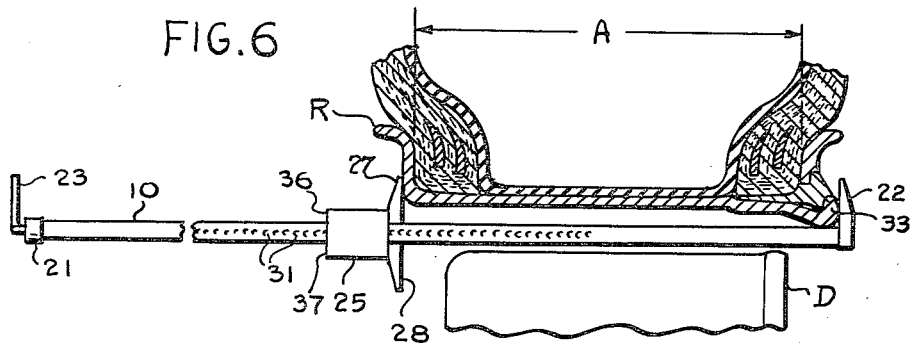
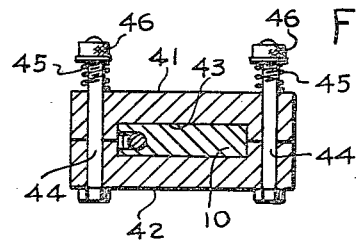
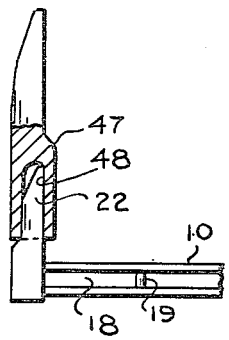
INVENTOR.
Charles G. Conger
BY
William Cleland
Attorney United States Patent Office 2,774,144
Patented Dec. 18, 1956

2,774,144

WIDTH GAUGE FOR VEHICLE WHEEL RIMS

Charles Gillingham Conger, Durham, N. C.

Application May 5, 1951, Serial No. 224,705

2 Claims. (Cl. 33—143)

This invention relates to a gauge for measuring the width of a vehicle wheel rim, and in particular to a gauge for measuring the inside widths of such rims while the same have pneumatic tires mounted thereon.

In the tire industry it is often necessary or desirable to find out the exact inside measurement of a tire rim while the wheel assembly including the tire is still mounted on a truck, for example. This is usually for the purpose of determining the exact size of a replacement tire required for a particular type and size of rim, because the use of oversized or undersized tires on the rims may result in undue chafing, flexing, or abnormal stresses which cause tire failure or lessen the normal life expectancy of the tire. Gauges now on the market for this purpose have either been unreliable or limited as to use thereof, or have invited a certain amount of guesswork, all of which reduced or obviated the possibility of obtaining accurate results.

One object of the present invention is to provide a rim gauge of the character described by which the inside dimension between opposite bead flanges may be accurately determined without necessarily removing the tire from the rim.

Another object of the invention is to provide a gauge of the character described which may be readily passed through a relatively narrow space inwardly of the rims, such as the spaces between rims and brake drums of wheel assemblies.

Another object of the invention is to provide a gauge of the character described which requires a minimum of skill to use properly and yet which is simple and economical to manufacture.

Other objects of the invention will be manifest from the following brief description and the accompanying drawings.

Of the accompanying drawings:

Figure 1 is a top plan view of a rim gauge embodying the features of the invention.

Figures 2 and 3 are edge views thereof, as viewed from the left and right, respectively, of Figure 1.

Figure 4 is a bottom plan view of the gauge.

Figure 5 is an enlarged cross-section taken substantially on the line 5—5 of Figure 1.

Figure 6 is a fragmentary cross-section through a rim area of a wheel assembly, illustrating the use of the gauge for measuring the rim.

Figure 7 is a cross-section corresponding to Figure 5, illustrating a modified form of the invention.

Figure 8 is an enlarged fragmentary view, corresponding to the top end of Figure 2, illustrating the use of adaptors for gauging drop-center rims.

Referring particularly to Figures 1 to 5 of the drawings the numeral 10 designates an elongated, relatively thin bar of rigid material, such as steel, aluminum, hard plastic, etc., the bar being rectangular in cross-section to define parallel opposite side edges 11 and 12, and parallel flat top and bottom faces 13 and 14. Scored on the flat faces 13 and 14 may be varyingly spaced indicia including lines 15 and corresponding data 16 indicating the rim dimensions of various makes, types and sizes of rims, in a manner to be described later.

Along the straight side edge 11 may be a groove 17 within which an elongated rod 18 is rotatably retained by longitudinally spaced pins, rivets or screws 19, received through the edge portion of the bar, outwardly of the rod. The rod may be firmly retained against longitudinal movement of the same in the groove 17, as by means of a collar 21 fixed on the rod and engaging one end of the bar, and a gauging finger 22 fixed on the opposite end of the rod and engaging the corresponding end of the bar. Finger 22 in a retracted position, engages flatly with the end of the bar, and its length and thickness approximate the corresponding cross-sectional dimensions of the bar, so as to superpose flatly upon the same in retracted position, without protrusions which would interfere with insertion of the gauge in a narrow space slightly greater than the cross-section of the bar. An angular extension 23 on the opposite end of rod 18 facilitates rotation of the rod with respect to the bar. The free end of the finger 22 is shown tapered to a straight edge to facilitate scraping grease, dirt, rust or other material from the part of the rim to be engaged thereby.

A slide member 25 has a rectangular opening 26 therethrough for sliding reception of the bar 10, and fingers 27 and 28 are fixed on the member to extend freely outwardly of the opposite flat sides 13 and 14 thereof, inwardly presented flat faces of the respective fingers 27 and 28 being adapted to be spaced from the inner flat face of finger 22 when the same is presented in corresponding direction by turning the rod 18.

For releasably retaining the slide member 25 in adjusted positions along the bar 10 a spring-pressed detent or ball 30 (Figure 5) may be suitably mounted in the member for yielding engagement in a series of depressions 31 along the edge 12 of the bar, said depressions corresponding to the respective indicia lines 16 on each flat side the bar (see Figures 1, 3 and 5).

In use of the gauge described above to determine the standard "rim width" A thereof, while the rim R remains mounted on a wheel, and without removing the tire, as shown in Figure 6, the gauge with the longitudinally fixed finger 22 at the leading end thereof in the retracted position shown in full lines in Figures 1 to 4, is inserted flatwise through available space between the usual brake drum D and the inner side of the base of the rim, and with said leading end of the bar extended inwardly. The rim illustrated is a 6.0R5° which, as far as the corresponding tire size is concerned, is a Firestone Steel Products Company rim having a width A of six inches and a five degree taper at the bead seating portions.

With the bar 10 thus inserted, the operator grips handle 23 to turn the rod 18 until the finger 22 is at right angles to the plane of the bar, and then by feel he engages the inner flat side of the finger firmly against the innermost edge portion of the gutter flange 33 of the rim base. Next, he moves the slide member 25 inwardly until the correspondingly extended finger 27 engages the outer face 34 of the opposite rim flange 35, at which point the edge 36 of the slide member, serving as an indexing means, will coincide with the indexing line reading "6.0 R.5°." According to standards of the National Wheel and Rim Association, this designates a "Firestone R-5° Full Advanced Demountable Rim." Thus by a very simple operation the width A is quickly determinable for ordering the correct size of tire replacement for the rim. Other indicia on the bar corresponds to different types and sizes of rims of various manufacturers thereof. When the measurement has been determined, the rod 18 is again turned to swing the finger 22 to retracted position to permit withdrawal of the gauge from the wheel.

In Figure 7 is illustrated a modified form of slide member 40, comprising two opposite U-shaped parts 41 and 42 defining a rectangular opening 43 for sliding reception of the bar 10, the two parts being shown yieldingly and clampingly urged together by bolts 44 extended through the slide member at opposite sides of the bar, and springs 45 engaged between the part 41 and nuts 46 on threaded extensions of said bolts. The clamping pressure on the parts 41 and 42 is effective yieldingly to retain the cross-member in various adjusted positions along the bar 10.

Figure 8 shows a finger extension 47 having a recess 48 for tight sliding reception of the ends of gauging fingers 22, 27 or 28, the freely extended portion of the extension being similar in shape to the gauging portions of said gauging fingers. The flat gauging face of the extension finger is off-set to be in alignment with the corresponding flat faces of the engaging finger. With these finger extensions attached on opposite gauging fingers the gauge may be used for obtaining width A of drop-center rims, wherein the usual center well of the rim necessitates provision of longer gauging fingers.

Other modifications of the invention may be resorted to without departing from the spirit thereof or the scope of the appended claims.

What is claimed is:

1. A device for gauging widths of automotive vehicle wheel rims, comprising an elongated, relatively thin flat bar of rectangular cross-section and having on at least one flat face thereof spaced indicia corresponding to given widths of various wheel rims, said bar having a groove of substantial depth opening laterally outwardly along the length of the edge thereof and defining spaced wall portions, an elongated rod of diameter approximating the width of said groove to be rotatably received within the same, means between said wall portions overlying said rod to retain the same rotatably within said groove, said rod having a gauging finger affixed thereon to be positioned at one end of the bar, said finger being of relatively narrow width not substantially exceeding the thickness of the bar and having a flat inwardly presented gauging face, means on said rod adjacent the other end of the bar for rotating the rod to swing said finger thereon from a retracted position in which it is superimposed with respect to said one end of the bar to a freely extended gauging position at an angle to the general plane of the bar and with said gauging face at right angles to said plane for engagement of the gauging face with one side portion of a rim, a member having a rectangular opening slidably receiving said bar and having thereon a second finger adapted to extend in the same direction as the freely-extended first-named finger and having a flat engaging face at right angles to said plane for engagement with an opposite side portion on the rim, and indicator means on said member and including an edge portion coordinated with the gauging face of said second finger for indicating on said indicia the corresponding width of a rim so engaged at opposite side portions by said gauging faces.

2. A device for gauging widths of automotive vehicle wheel rims, comprising an elongated, relatively thin flat bar of rectangular cross-section and having on at least one flat face thereof spaced indicia corresponding to given widths of various wheel rims, said bar having a groove of substantial depth opening laterally outwardly along the length of the edge thereof and defining spaced wall portions, an elongated rod of diameter approximating the width of said groove to be rotatably received within the same, means between said wall portions overlying said rod to retain the same rotatably within said groove, said rod having a gauging finger affixed thereon to be positioned at one end of the bar, said finger being of relatively narrow width not substantially exceeding the thickness of the bar and having a flat inwardly presented gauging face, means on said rod adjacent the other end of the bar for rotating the rod to swing said finger thereon from a retracted position in which it is superimposed with respect to said one end of the bar to a freely extended gauging position at an angle to the general plane of the bar and with said gauging face at right angles to said plane for engagement of the gauging face with one side portion of a rim, a member having a rectangular opening slidably receiving said bar and having thereon a second finger adapted to extend in the same direction as the freely extended first-named finger and having a flat engaging face at right angles to said plane for engagement with an opposite side portion on the rim, and indicator means on said member and including an edge portion coordinated with the gauging face of said second finger for indicating on said indicia the corresponding width of a rim so engaged at opposite side portions by said gauging faces, releasable means being provided on said member for retaining the same in various positions of adjustment thereof along said bar.

References Cited in the file of this patent

UNITED STATES PATENTS

| | | |
|---|---|---|
| 1,110,879 | Brown | Sept. 15, 1914 |
| 1,245,213 | Gammeter | Nov. 6, 1917 |
| 1,282,030 | Benemelis | Oct. 22, 1918 |
| 1,457,964 | Doty | June 5, 1923 |
| 1,726,193 | Ross | Aug. 27, 1929 |
| 2,043,614 | Hane | June 9, 1936 |
| 2,311,323 | Addis | Feb. 16, 1943 |
| 2,563,440 | Wilson et al. | Aug. 7, 1951 |

FOREIGN PATENTS

| | | |
|---|---|---|
| 546,157 | Great Britain | June 30, 1942 |